(12) United States Patent
Vandepitte

(10) Patent No.: US 8,359,997 B2
(45) Date of Patent: Jan. 29, 2013

(54) ARRANGEMENT OF PAINTING ROBOTS

(75) Inventor: Frederik Vandepitte, Reiskirchen (DE)

(73) Assignee: ABB AG, Mannheim (DE)

( * ) Notice: Subject to any disclaimer, the term of this patent is extended or adjusted under 35 U.S.C. 154(b) by 236 days.

(21) Appl. No.: 12/808,794

(22) PCT Filed: Dec. 5, 2008

(86) PCT No.: PCT/EP2008/010294
§ 371 (c)(1),
(2), (4) Date: Jun. 17, 2010

(87) PCT Pub. No.: WO2009/080183
PCT Pub. Date: Jul. 2, 2009

(65) Prior Publication Data
US 2010/0269750 A1 Oct. 28, 2010

(30) Foreign Application Priority Data
Dec. 20, 2007 (DE) .......................... 10 2007 062 403

(51) Int. Cl.
*B05B 3/00* (2006.01)
*B05B 15/12* (2006.01)
*B05B 7/06* (2006.01)

(52) U.S. Cl. ......... 118/323; 118/326; 118/309; 118/324

(58) Field of Classification Search ................... 118/323, 118/321, 309, 326, 634, 50, DIG. 7, 324; 454/50, 53; 901/43; 55/DIG. 56; 427/427.1, 427/427.2
See application file for complete search history.

(56) References Cited

U.S. PATENT DOCUMENTS

| | | | |
|---|---|---|---|
| 4,714,044 A | 12/1987 | Kikuchi et al. | |
| 4,768,462 A | 9/1988 | Kuronaga et al. | |
| 5,989,643 A * | 11/1999 | Nakagawa et al. | 427/424 |
| 2005/0051085 A1* | 3/2005 | Krogedal et al. | 118/313 |

FOREIGN PATENT DOCUMENTS

| | | |
|---|---|---|
| DE | 102004033640 A1 | 5/2005 |
| DE | 102006045642 A1 | 11/2007 |
| GB | 2177946 A | 2/1987 |
| JP | 1266870 A1 | 10/1989 |
| WO | 0168267 A1 | 9/2001 |
| WO | 2008071329 A1 | 6/2008 |

OTHER PUBLICATIONS

International Search Report by European Patent Office re PCT Application PCT/EP2008/010294, filed Dec. 5, 2008, by ABB AG.

* cited by examiner

*Primary Examiner* — Yewebdar Tadesse
(74) *Attorney, Agent, or Firm* — Anthony M. Del Zoppo, III; Driggs, Hogg, Daugherty & Del Zoppo Co., LPA

(57) ABSTRACT

The invention relates to an arrangement of fixedly mounted painting robots in a painting booth, wherein the painting booth is subdivided by an imaginary vertical plane into a first spatial region and a second spatial region and wherein at least two painting robots with overlapping working areas are arranged in at least one of the two regions. A respective reference point of a painting robot is a point of intersection of a first axis of rotation with a painting robot base of the painting robot concerned. Each reference point is arranged above an imaginary horizontal plane which is determined by the vertically highest point of a predetermined object to be painted in the painting position, and the reference points are offset with respect to one another in the vertical direction and/or horizontally, transversely in relation to the vertical plane.

20 Claims, 2 Drawing Sheets

ARRANGEMENT OF PAINTING ROBOTS

RELATED APPLICATIONS

Figure 1:
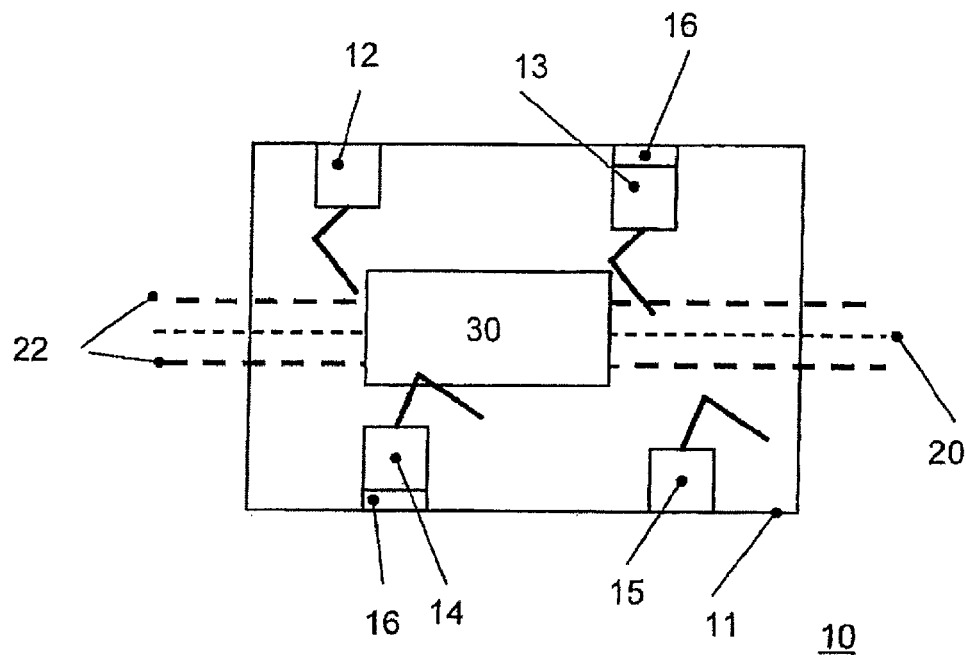

This application is a national filing of PCT application Serial No. PCT/EP2008/010294, filed Dec. 5, 2008, which claims priority of German application Serial No. 10 2007 062 403.6, filed Dec. 20, 2007.

DESCRIPTION

The invention relates to an arrangement of fixedly mounted painting robots in a painting booth, wherein the painting booth is subdivided by an imaginary vertical plane into a first and a second spatial region, wherein at least two painting robots with overlappable working areas are arranged in at least one of the two regions, and wherein a respective reference point is a point of intersection of a first rotational axis with a painting robot base of the painting robot concerned.

It is commonly known that for industrial coating technology painting robots are used. These are usually arranged in a painting booth through which runs a conveying system with which the paint objects can be conveyed into and out of the painting booth. The painting robots are usually arranged with their robot base in the lower region of the painting booth, that is to say at a similar vertical height relative to the floor of the painting booth as the paint objects, for example motor vehicle bodies or bumpers.

The arrangement of the painting robots is usually made along a line parallel to the direction of conveyance of the conveying system. Depending on the application, the painting robots are arranged on a travel axis which likewise runs parallel to the direction of conveyance of the conveying system.

A drawback with this arrangement is, in particular, that a high floor space requirement of a painting booth results therefrom. The scope in the design of the movement programs of the painting robots is likewise adversely affected, since the respective robot base in such an arrangement constitutes an interfering contour for the painting robot.

As an approach to the solution, painting robots are known, the base of which is arranged elevated relative to the painting booth floor. They stand, for instance, on a suitable pillar in the wall region of the painting booth. An example of such a robot is the IRB 5500 from the company ABB. Painting robots of this type have since likewise been arranged along a line parallel to the direction of conveyance of the conveying system.

In this way, the space taken up by a painting robot is situated predominantly in a region of the painting booth which lies above the paint object. Advantageously, a narrower painting booth width can hereby be realized. Only the robot arm is moved, in accordance with the painting program, partially beneath the horizontal plane. Typical painting booth widths for motor vehicle bodies are, for instance, about 5.5 m, by virtue of arrangement according to the invention, booth widths of less than 5 m are feasible.

A drawback with such an arrangement is that, in particular, the length requirement of a painting booth rises, since robots of this type, in order to reduce a risk of collision, are arranged at a greater distance apart parallel to the direction of conveyance of the conveying system than traditional fixed robots in the floor region of the painting booth. This greater distance apart results from the predominant working direction of the robot, vertically downward.

Starting from this prior art, the object of the invention is to specify an arrangement of painting robots of this type, which arrangement reduces the spatial requirement in a painting booth, in particular the length requirement.

This object is achieved according to the invention by an arrangement of painting robots having the features specified in claim 1.

Accordingly, the arrangement of painting robots in the manner stated in the introduction is characterized in that each reference point is arranged above an imaginary horizontal plane which is determined by the vertically highest point of a predefined paint object in the painting position, and in that the reference points are mutually offset in the vertical direction and/or horizontally, transversely to the vertical plane.

As the predefined object, an object which is to be painted in the prescribed manner should preferably be chosen, which object has the largest dimensions, in particular in the vertical direction, which can be expected within the painting booth concerned during painting operation with the painting robot arrangement according to the invention. In the selection of the object, the painting position thereof should likewise be taken into account. If a plurality of paint objects, for instance bumpers, are arranged in accordance with the painting exercise on a common holding apparatus, the vertically highest object is determinant of the position of the horizontal plane. Where appropriate, an absolute limit of the vertical height of the horizontal plane is also given in the production engineering surrounds of a painting booth. For instance, an oven which is placed upstream or downstream of the painting booth in terms of the conveying system has a predefined clearance height, which limits the vertically maximally permitted height of a paint object.

The vertical minimum height of the respective painting robots lies above the vertically highest point of a predefined paint object in the painting position, i.e. when the object is arranged on a product carrier provided for this purpose or on a holding mechanism. Preferably, the whole of the robot base is placed above this vertically highest point. A particularly suitable vertical distance of the reference point of a painting robot to the vertically highest point of the paint object is thus, for instance, 0.5 to 1.5 m.

An inventive offset of the painting robots in the horizontal direction transversely to the vertical plane advantageously enables adjacent painting robots to be arranged closer together and the spatial requirement of the painting booth to be additionally reduced. In this way, the working areas of the painting robots undercut one another.

Similarly, the working areas of adjacent painting robots of this type can be corrected by an offset in the vertical direction.

In a further embodiment of the subject of the invention, at least one of the at least two painting robots is arranged in such a way that its first rotational axis runs within an angular range of −45° to +45° relative to a horizontal plane.

In this way, the motional direction of the robot arm of the first axis is predominantly parallel to the vertical plane. The common working area of adjacent robots is thus reduced in a particularly advantageous manner.

In one embodiment of the subject of the invention, the predefined paint object is a motor vehicle body.

Here, the advantages of the arrangement according to the invention are particularly pronounced, since a motor vehicle body has, with about 1.6 m to 2 m, a high width, and the local separation of robot base and paint object offers particular scope for reducing the painting booth width.

In a further preferred embodiment of the subject of the invention, the at least two painting robots are arranged with their respective reference points at least 1.5 m above the painting booth floor. This corresponds to a typical vertical height of a motor vehicle body.

In a particularly preferred embodiment, the vertical offset of the at least two reference points is at least 0.25 m.

This corresponds roughly to the diameter of a robot arm, so that the robot arms can be moved past one another without difficulty in two mutually adjacent motional planes.

Similar advantages are obtained from an offset of at least 0.25 m in the horizontal direction running transversely to the imaginary vertical plane. A preferred value in respect of the last-named values is, however, 0.5 m. This allows two robot arms to be guided past each other in a particularly problem-free manner.

In a further embodiment, at least two painting robots are respectively arranged in the first and second region of the painting booth.

This allows all paint surfaces, particularly in respect of motor vehicle bodies, to be reached symmetrically and on both sides.

In a preferred embodiment, painting robots in the first region of the painting booth and the second region of the painting booth are arranged respectively opposite each other with, at most, a horizontal offset of the reference points parallel to the imaginary vertical plane of 1.2 m.

This embodiment advantageously allows the required painting booth length to be further reduced. A minimum offset of opposite painting robots parallel to the vertical plane is advantageous to prevent collisions between opposite robots which have a mirrored movement program sequence. This can also be avoided, however, by a suitable division of the working fields of the painting robots. For instance, a robot can thus paint preferably horizontal surfaces of a motor vehicle body and vertical surfaces lying opposite said robot.

In a further embodiment, structurally identical painting robots are used.

Working areas, because of their basic equality, are hence particularly simple.

Further advantageous embodiment options can be derived from the further dependent claims.

Figure 2:
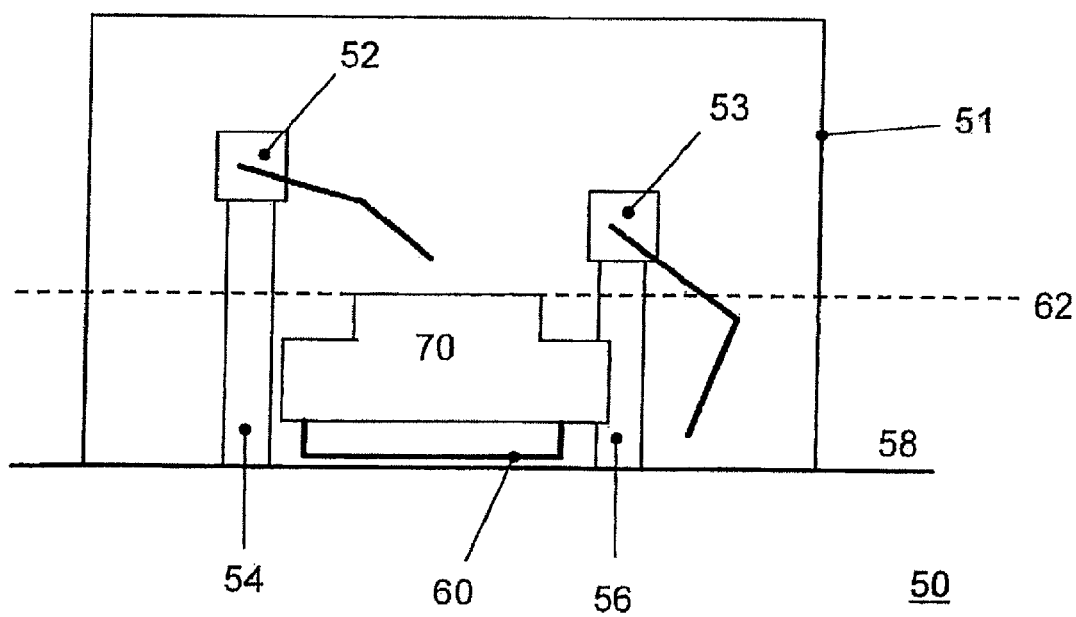

The invention, further embodiments and further advantages shall be described in greater detail with reference to the illustrative embodiments represented in the drawings, wherein:

FIG. 1 shows a top view of an exemplary first painting booth containing an inventive arrangement comprising four painting robots, FIG. 2 shows a side view of an exemplary second painting booth containing an inventive arrangement comprising four painting robots.

FIG. 1 shows a top view of an exemplary painting booth 10 containing four structurally identical painting robots 12, 13, 14, 15. The robot 13, by the addition of an intermediate piece 16, is offset relative to the robot 12 transversely to the vertical plane 20 in the horizontal direction. The lateral working area of the robot 13 has thereby been displaced more into the middle of the booth. The lateral working area of the painting robot 12 is not additionally displaced in the direction of the middle of the booth, so that the common working area, which is associated with a risk of collision of the painting robots 12 and 13, has been thereby reduced. Alternatively, if the size of the common working area is maintained, a reduction of the distance apart of the robots 12 and 13 parallel to the plane 20 is conceivable.

The horizontal distance, transversely to the direction of conveyance, between the oppositely arranged painting robots 12 and 14, and 13 and 15 is the same. Depending on the painting strategy, it is thereby easily possible to make the working field of the painting robot 12 and of the painting robot 15, as well as that of the painting robot 13 and 14, similar. For instance, robot movement program parts of said robot groupings can be transferred, by mirroring of robot movement program parts at the vertical plane 22, from the painting robot 12 to the painting robot 15.

A floor conveyor 22, which is realized, for instance, by two drag chains, serves to transport a first motor vehicle body 30 into the painting booth.

FIG. 2 shows a side view of an exemplary second painting booth 50 containing four painting robots, though only the painting robots 52 and 53 are shown. These correspond, in terms of the principle, to the painting robots 12 and 13 shown in FIG. 1.

The painting robot 52 is mounted on a first pillar 54 and the painting robot 53 on a second pillar 56. The first pillar 54 is vertically higher than the second pillar 56, giving rise to a vertical offset of the bases of the painting robots 52 and 53. This offset advantageously reduces the common working area of the painting robots 52 and 53.

A second motor vehicle body 70 is located on a holding apparatus 60 standing on the floor conveyor (not represented in this figure). The distance of the horizontal plane 70 to the booth floor 58 running parallel thereto results from the vertical height of the second body 70, or of the highest vertical point thereof, and of the holding apparatus 60 on which this is located, and from the height of the chain conveyor (not shown) relative to the booth floor 58. This is usually a grid.

The shown painting robots 52 and 53 are indicated mounted with a horizontally running first axis. The painting robots 52 and 53 are located with their squarely indicated robot bases above the horizontal plane 70, whereby more freedom of movement of the respective robot arms beneath the plane 70 is ensured.

Figure 3:
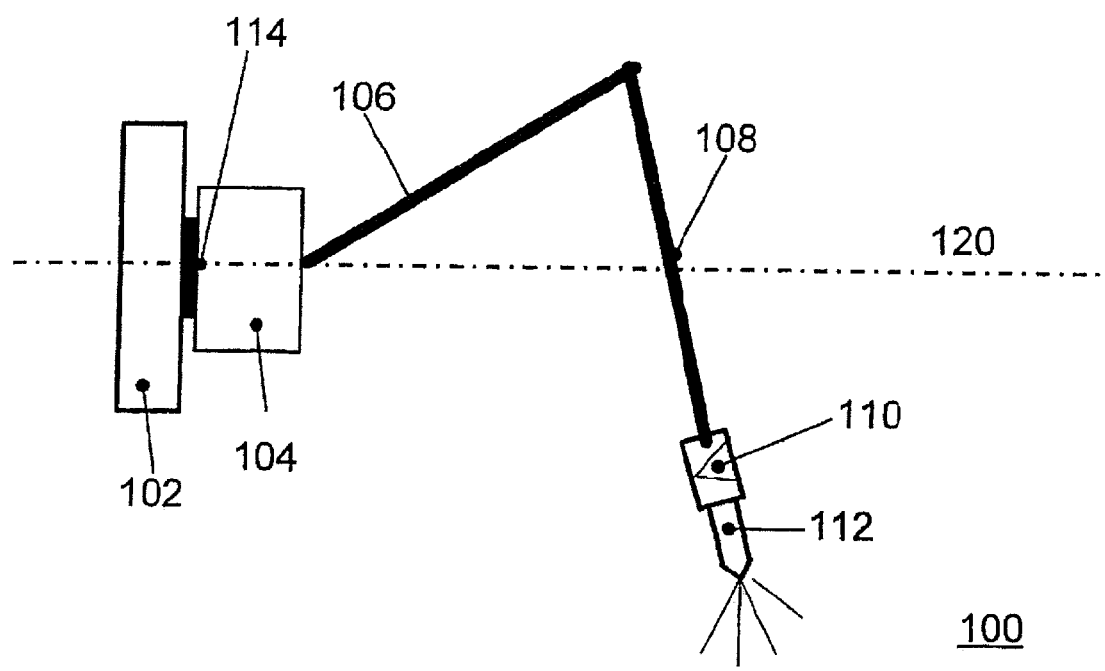

FIG. 3 shows an exemplary possible construction of a painting robot 100. On a fastening apparatus 102, which is part of the painting robot 100, a robot base 104 is mounted rotatably about the first rotational axis 120. The fastening apparatus 102 is connected, for instance directly or via an intermediate piece, to a pillar (not shown in this figure) of suitable bearing capacity and dynamic load capacity. On that side of the robot base which is facing the fastening apparatus, the point of intersection with the first rotational axis 120 is labeled as the reference point 114. Additionally fastened to the robot base is the robot arm, which has a first robot arm piece 106, a second robot arm piece 108 and a wrist 110. To the wrist 110 there is fastened a paint sprayer 112.

The alignment of the first rotational axis 120 is represented in FIG. 1 in a preferred horizontal alignment at an angle of 0° relative to a horizontal plane (not shown).

REFERENCE SYMBOL LIST

10 Top view of an exemplary first painting booth containing an inventive arrangement comprising four painting robots
11 Floor space, first painting booth
12 First painting robot
13 Second painting robot
14 Third painting robot
15 Fourth painting robot
16 Intermediate piece
20 Vertical plane
22 Chain conveyor
30 First motor vehicle body
50 Side view of an exemplary second painting booth containing an inventive arrangement comprising four painting robots
51 Side view, second painting booth
52 Fifth painting robot 53 Sixth painting robot
54 First pillar
56 Second pillar
58 Painting booth floor
60 Holding apparatus for body
62 Horizontal plane
70 Second motor vehicle body
100 Exemplary possible construction of a painting robot
102 Fastening apparatus
104 Robot base
106 First robot arm piece
108 Second robot arm piece
110 Wrist
112 Sprayer
114 Reference point
120 First rotational axis

What is claimed is:

1. An arrangement, comprising:
a painting booth;
a conveyor system having a direction of conveyance into and out of the painting booth, wherein the painting booth is subdivided by an imaginary vertical plane that extends along the direction of conveyance into first and second spatial regions;
a plurality of fixedly mounted painting robots located in the painting booth, wherein at least two of the painting robots are arranged stationarily on an axis that runs parallel to the direction of conveyance and have overlappable working areas arranged in at least one of the two spatial regions, and a respective reference point is a point of intersection of a first rotational axis with a painting robot base of the painting robot concerned,
wherein each reference point is arranged above an imaginary horizontal plane which is determined by the vertically highest point of a predefined object to be painted in the painting position, and the reference points are mutually offset horizontally, transversely to the vertical plane.

2. The arrangement as claimed in claim 1, wherein at least one of the at least two painting robots is arranged in such a way that its first rotational axis runs within an angular range of −45° to +45° relative to a horizontal plane.

3. The arrangement as claimed in claim 2, wherein the predefined object to be painted is a motor vehicle body.

4. The arrangement as claimed in claim 3 wherein the at least two painting robots are arranged with their respective reference points at least 1.5 m above the painting booth floor.

5. The arrangement as claimed in claim 4 wherein the at least two reference points are mutually offset by at least 0.25 m in the vertical direction.

6. The arrangement as claimed in claim 5 wherein the at least two reference points are mutually offset by at least 0.25 m horizontally, transversely to the imaginary vertical plane.

7. The arrangement as claimed in claim 6 wherein at least two painting robots are respectively arranged in the first and second spatial regions of the painting booth.

8. The arrangement as claimed in claim 7, wherein painting robots in the first spatial region of the painting booth and the second spatial region of the painting booth are arranged respectively opposite each other with, at most, a horizontal offset of the reference points parallel to the imaginary vertical plane of 1.2 m.

9. The arrangement as claimed in claim 7, wherein opposite painting robots have an oppositely directed offset in the horizontal direction transversely to the vertical plane.

10. The arrangement as claimed in claim 7, wherein opposite painting robots have an oppositely directed offset in the vertical direction.

11. The arrangement as claimed in claim 10, wherein the used painting robots are structurally identical.

12. The arrangement as claimed in claim 1, wherein the predefined object to be painted is a motor vehicle body.

13. The arrangement as claimed in claim 1, wherein the at least two painting robots are arranged with their respective reference points at least 1.5 m above the painting booth floor.

14. The arrangement as claimed in claim 1, wherein the at least two reference points are mutually offset by at least 0.25 m in the vertical direction.

15. The arrangement as claimed in claim 1, wherein the at least two reference points are mutually offset by at least 0.25 m horizontally, transversely to the imaginary vertical plane.

16. The arrangement as claimed in claim 1, wherein at least two painting robots are respectively arranged in the first and second region of the painting booth.

17. The arrangement as claimed in claim 16, wherein painting robots in the first region of the painting booth and the second region of the painting booth are arranged respectively opposite each other with, at most, a horizontal offset of the reference points parallel to the imaginary vertical plane of 1.2 m.

18. The arrangement as claimed in claim 17, wherein opposite painting robots have an oppositely directed offset in the horizontal direction transversely to the vertical plane.

19. The arrangement as claimed in claim 17, wherein opposite painting robots have an oppositely directed offset in the vertical direction.

20. The arrangement as claimed in claim 1, wherein the used painting robots are structurally identical.

* * * * *